United States Patent

[11] 3,624,064

| [72] | Inventors | Yasushi Toyoda<br>Nishiki-shi;<br>Nobuo Bannai, Nishiki-Machi, both of Japan |
|---|---|---|
| [21] | Appl. No. | 726,366 |
| [22] | Filed | May 3, 1968 |
| [45] | Patented | Nov. 30, 1971 |
| [73] | Assignee | Kureha Kagaku Kogyo Kabushiki Kaisha<br>Tokyo-to, Japan |
| [32] | Priority | May 15, 1967 |
| [33] | | Japan |
| [31] | | 42/30735 |

[54] POLYMERIZATION OF FLUOROETHYLENES
3 Claims, 2 Drawing Figs.

[52] U.S. Cl. .................................................... 260/92.1,
260/87.5 A, 260/87.7
[51] Int. Cl. .................................................... C08f 3/22,
C08f 15/06
[50] Field of Search .......................................... 260/87.5 A,
92.1, 87.7

[56] References Cited
UNITED STATES PATENTS

| 2,464,062 | 3/1949 | Strain ........................... | 260/92.1 |
| 3,193,543 | 7/1965 | Ragazzini et al. ............. | 260/92.1 |

FOREIGN PATENTS

| 1,094,558 | 12/1967 | Great Britain ................ | 260/92.1 |

*Primary Examiner*—Joseph L. Schofer
*Assistant Examiner*—J. A. Donahue, Jr.
*Attorney*—Wenderoth, Lind & Ponack ABSTRACT: The temperature in the suspension polymerization of fluoroethylene is maintained below its critical temperature during the initial period of the process and is raised above the critical temperature after polymer particles have been formed. In a variation of this method, a supplementary quantity of the monomer is added to the process, beginning at the time the temperature is raised, in a manner to avoid causing large variation in the polymerization pressure. In a further variation of this method, the temperature is raised to a value from 60° to 150° C. in the final period of the polymerization.

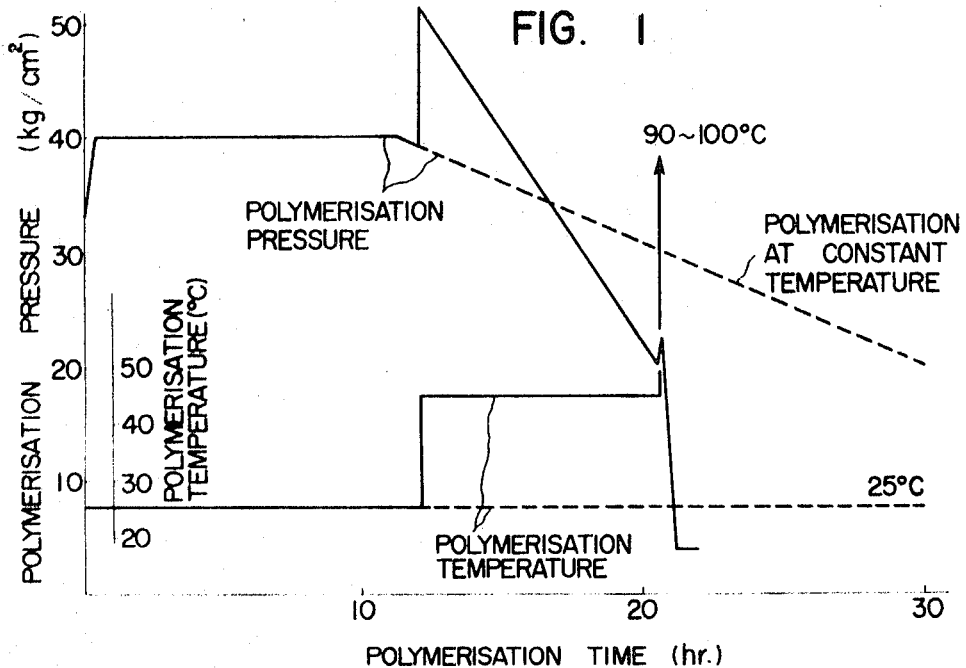
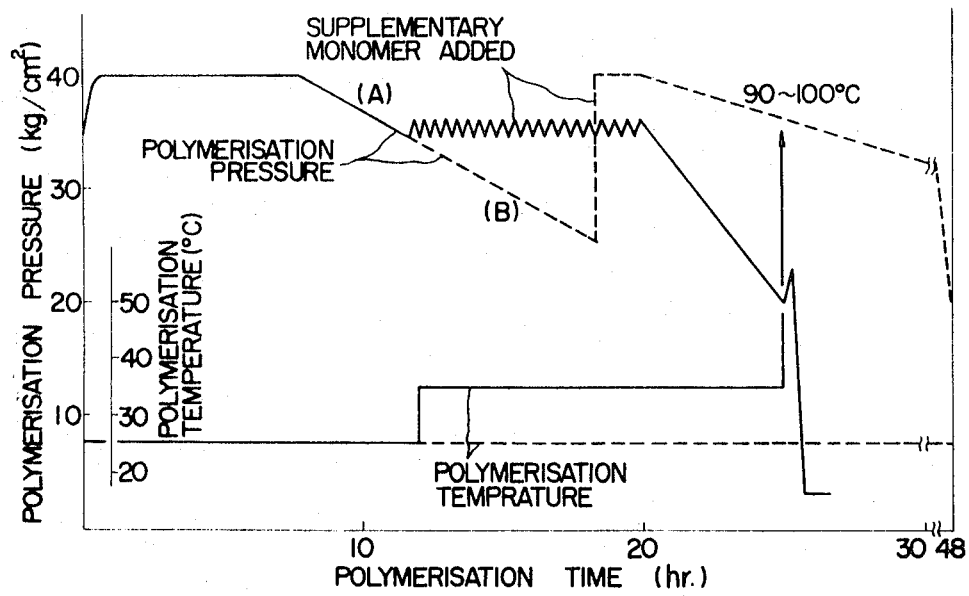

POLYMERIZATION OF FLUOROETHYLENES

BACKGROUND OF THE INVENTION

This invention relates generally to the field of polymerization and more particularly to a new and improved method for suspension polymerization of fluorine-substituted ethylenes.

The critical temperatures of fluorine-substituted ethylene monomers such as vinyl fluoride, vinylidene fluoride, trifluoroethylene, and tetrafluoroethylene are low, that of vinylidene fluoride, for example, being 30.1° C., and that of tetrafluoroethylene being 33.3° C. Consequently, when these monomers are to be subjected to suspension polymerization or suspension copolymerization, these low critical temperatures impose a natural restriction on the process, and it is necessary to select a catalyst by which polymerization can be effectively carried out at such low temperatures.

On one hand, polymers of fluorine-substituted ethylene, in general, have high heat resistance but have relatively high molding temperatures. For this reason, the thermal stability of these polymers at their molding temperatures becomes a problem. In general, when polymerization is carried out at low temperatures, the rate of polymerization is slow. Accordingly, the common practice is to increase the quantity of catalyst used, but a large quantity of catalyst is considered to be a cause of poor thermal stability. Another difficulty is that the use of catalysts of greater activity is undesirable for reasons such as danger accompanying their handling. Consequently, it has heretofore been difficult to realized a substantial improvement in the rate of suspension polymerization of fluorine-sutstituted ethylene.

As a result of our research over several years relative to suspension polymerization of fluorine-substituted ethylene, we have made the following discoveries.

1. The polymerization time can be greatly shortened by carrying out polymerization initially at a temperature below the critical temperature of the monomer and then raising the polymerization temperature above the critical temperature after polymer particles have been formed.

2. An extremely great effect in increasing the polymerization yield and in increasing the thermal stability of the polymer product can be attained by increasing the temperature at the final period of polymerization further to a temperature in the neighborhood of from 60° to 100° C.

3. While a supplementary addition of the monomer at an intermediate point in the polymerization is extremely effective in increasing the apparent density of the resulting polymer, when this supplementary addition of the monomer is carried out without a great fluctuation in the polymerization pressure, an extremely great increase in the thermal stability of the polymer is attained.

That is, in polymerization by dispersing the monomer in gaseous state from the beginning in water, in general, a suspension polymer of uniform particles cannot be obtained. When, moreover, an organic catalyst is used as the polymerization catalyst, it diffuses even into the gaseous phase and gives rise to the occurrence also of block polymerization. Accordingly, it has been the practice heretofore to carry out suspension polymerization at temperatures below the critical temperature of the monomer.

We have found, however, that when suspension polymerization of fluorine-substituted ethylene is carried out by maintaining the reaction temperature below the critical temperature of the monomer only during the initial period of polymerization, and then the reaction temperature is raised above the critical temperature after the polymerization has progressed to a certain degree, whereby nuclei of solid particles are formed, uneven particles, surprisingly, are not formed, but suspension polymerization particles equal to those obtained by polymerization entirely at temperatures below the critical temperature are produced.

Furthermore, as a result of the raising of the reaction temperature during the latter part of the polymerization according to the invention, the rate of polymerization becomes high, whereby we have succeeded in shortening the polymerization time.

The reasons for this unexpected result may be considered to be as follows. When the polymerization progresses to a certain degree, and nuclei of polymer particles are formed, almost all of the monomer coexisting with these polymer particles assumes a state wherein it is adsorbed by the polymer particles and, therefore, does not separate from these particles even when the reaction temperature rises, and the monomer becomes a gas. Furthermore, almost all of the oil soluble catalyst is also adsorbed by these polymer particles, and the polymerization thereafter occurs around these particles as nuclei.

SUMMARY OF THE INVENTION

It is an object of the present invention to overcome the aforedescribed difficulties encountered heretofore by utilizing our findings as described above and hereinafter.

More specifically, an object of the invention is to provide a suspension polymerization method comprising relatively simple process steps whereby the polymerization is remarkably shortened, the yield and thermal stability of the resulting are substantially increased, and a polymer having highly desirable properties including a high apparent density can be produced.

According to the present invention, briefly summarized, there is provided, in a process of polymerization or copolymerization of at least one monomer selected from fluorine-substituted ethylenes, a polymerization method characterized by the steps of suspension polymerizing the monomer at a temperature below the apparent critical temperature thereof in the initial period of the process and raising the polymerization temperature above the critical temperature after polymer particles have been formed.

In accordance with the present invention, in another aspect thereof, a supplementary quantity of the monomer is added to the process as described above, beginning at the time when the temperature is raised, in a manner to avoid causing large variation in the polymerization pressure.

In accordance with the present invention, in a further aspect thereof, the polymerization temperature in the above described process is raised to a value of from 60° to 150° C. in the final period of the polymerization.

The nature, details, and utility of the invention will be more clearly apparent from the following detailed description beginning with a consideration of the general aspects of the invention and concluding with specific examples of preferred embodiment thereof.

BRIEF DESCRIPTION OF THE DRAWING

In the drawing:

FIGS. 1 and 2 are graphical representations indicating the polymerization characteristics of the processes set forth respectively in examples 1 and 2 presented hereinafter.

DETAILED DESCRIPTION OF THE INVENTION AND THE PREFERRED EMBODIMENTS

While it is desirable, in general, to raise the reaction temperature when the polymerization pressure begins to decrease (polymerization yield approximately 50 percent), as indicated in FIG. 1, it is not necessary in all cases to raise the temperature at this time. The temperature may be raised when polymer particles are formed within the polymerization vessel, and outer shells thereof of a certain degree of hardness have been formed. The temperature raising time differs with the ratio $H_2O$/monomer, but we have found that in most cases a suitable time is that when the yield reaches a value of from 20 to 30 percent.

Since, in general, the rate of polymerization decreases in the latter part of the polymerization reaction, the ordinary practice is to stop the polymerization in a state wherein a large quantity of still unreacted monomer is still present within the polymerization vessel and to recover this unreacted monomer.

We have found, however, that by raising the temperature within the polymerization vessel to from 60° to 150° C. prior to stopping the polymerization and maintaining this state for approximately 1 hour, the polymerization yield can be caused to reach 97 percent or even a higher value, whereby the process step of recovering the unreacted monomer becomes unnecessary, and, moreover, the thermal stability of the resulting polymer is remarkably improved. The reason for this desirable effect is that raising the temperature thus to from 60° to 150° C. causes the polymerization catalyst to decompose thoroughly and be removed.

The liquid specific gravity of the monomer at the polymerization temperature of ethylene fluoride is remarkably lower than the true specific gravity of the resulting polymer (since this temperature is in the vicinity of the critical temperature). For this reason, in general, the apparent specific gravity or density of the polymer becomes extremely small. The reason for this may be considered to be that, since the polymerization progresses with the particle size remaining at the liquid droplet size prior to polymerization, the resulting polymer particles are in a mass thereof with an extremely large number of voids, and, consequently, the apparent density becomes small.

A polymer of a low apparent density not only is inconvenient in handling for reasons such as its requiring large packaging containers and the tendency of its particles to cause clogging within hoppers but also has numerous other disadvantages such as the necessity of using a large compression ratio in molding its powder particles and the poor coating characteristic of its powder particles when used for coating objects.

While it is possible to increase readily the apparent density of this polymer by supplementarily adding the monomer at an intermediate point in the polymerization, we have found that this addition of the monomer can also be carried out at a polymerization temperature above the critical temperature.

We have found further that when this addition of the monomer is carried out with a large variation in the polymerization pressure as indicated by curve(B) in FIG. 2, the thermal stability of the polymer thus obtained is very much inferior, in some cases, to that of the polymer obtained without a supplementary addition of the monomer; but when the monomer is added without imparting a large variation in the polymerization pressure as indicated by curve (A), the thermal stability of the resulting polymer, surprisingly, does not vary from that of a polymer produced without any supplementary addition whatsoever of the monomer.

While the apparent density increases with the quantity of the monomer added in accordance with this discovery, we have found that, in general, an addition of approximately 25 percent of the quantity of the monomer initially charged results in an apparent density which is amply high for applications such as fluid lining.

In addition to the use of water as the dispersion medium in the suspension polymerization according to the invention, a solvent which, under the polymerization conditions, does not dissolve most of the monomer, does not react with the monomer, and, moreover, has little chain transfer effect at the time of polymerization can be used. Examples of such solvents are lower alcohols, lower ketones, and dioxane used singly or in the form of aqueous solutions thereof.

For the suspension (suspending agent), use can be made of a suspending agent generally used in the polymerization of vinyl compounds, as, for example, polyvinyl alcohol, gelatine, methylcellulose, and ethylcellulose. In some cases, these suspending agents can be used together with a known emulsifying agent.

As a polymerization catalyst, a catalyst which can effectively cause polymerization of the monomer to be polymerized at a temperature below the critical temperature of the monomer can be selected from catalysts such as organic peroxides, azocompounds, water-soluble persulphides, organic compounds of boron, and ordinary free radical forming catalysts such as those of the redox (oxidation-reduction) system.

While raising the polymerization temperature from an intermediate point in the process will accomplish the intended purpose if the temperature is raised to a value above the critical temperature of the monomer, an excessively high temperature will give rise to problems such as shortening of the life of the catalyst and excessive increase in the polymerization pressure. We have found that, accordingly, except in the case when a high temperature is to be used particularly for promoting and accelerating the decomposition of the catalyst immediately prior to stopping of the polymerization, the most desirable temperature ordinarily is from 10° to 20° C. higher than the critical temperature of the monomer.

Furthermore, in the case when the temperature is to be raised to a high value prior to stopping of the polymerization, and a high temperature rise rate is desired, the increase in temperature is started at the time at which the polymerization rate ordinarily becomes slightly slow after completion of charging of the monomer (i.e., the time at which the polymerization pressure normally drops to a value of approximately 20 kg./cm.$^2$.) Alternatively, however, the polymerization temperature may be gradually raised so as to maintain the polymerization pressure at an approximately constant value as the polymerization progresses after completion of charging of the monomer. In general, this temperature raising time is the time at which the polymerization yield reaches a value of from 80 to 95 percent of the total monomer charge.

In some cases, an apparent rise in the critical temperature of a fluorine-substituted olefin monomer is caused by substances such as an organic substance or a chain transfer agent other than water used as the dispersion medium or a monomer used as a copolymerization ingredient. In such a case, the apparent critical temperature exhibited by the monomer under the polymerization conditions may be considered to be the critical temperature to be used as a reference.

Thus, the present invention provides remarkable improvements, by simple process steps, in shortening the polymerization time and in increasing the polymerization yield and thermal stability of fluorine-substituted ethylene polymers and, moreover, is readily practiced, as indicated by the following examples.

In order to indicate still more fully the nature and utility of the invention, the following examples of typical procedures constituting preferred embodiments of the invention are set forth, it being understood that these examples are presented as illustrative only and that they are not intended to limit the scope of the invention.

Throughout these examples and other parts of this disclosure, the terms "temperature" and "pressure," unless otherwise specified, mean polymerization temperature and polymerization pressure, respectively.

EXAMPLE 1

A 6-liter stainless-steel autoclave (inner diameter 130 mm., depth 470 mm.) was charged with 3,500 grams (g.) of water, 3.5 g. of methylcellulose, 2.4 g. of sodium pyrophosphate ($Na_4P_2O \cdot 10H_2O$), and 6 g. of di-normal-propylperoxidicarbonate used as a polymerization catalyst. The autoclave was then thoroughly evacuated and maintained at a temperature below 20° C. as 1,200 g. of vinylidene fluoride monomer was conducted from a cylinder on a weighing scale, through a pipe, and into the autoclave and caused to condense therein.

During this charging of the monomer, the cylinder was slightly heated in order to prevent stoppage of the monomer transfer due to a drop in the monomer temperature because of the loss of the latent heat of vaporization thereof.

Upon completion of charging of the monomer of the specified quantity, the autoclave was placed in a constant-temperature water bath, the temperature of which was raised to 25° C. (below the critical temperature of the monomer), and polymerization within the autoclave was started with agitation at 300 r.p.m.

The pressure was initially 40 kg./cm.$^2$ but began to decrease at approximately 12 hours after the start of polymerization because of the progress of the reaction. At this time, the temperature was raised rapidly to 45° C. The pressure thereupon rose to 51 kg./cm.² but immediately began to decrease as indicated in FIG. 1 and reached 20 kg./cm² at approximately 20 hours after the start of polymerization. (This result represented a shortening of the polymerization time by approximately 10 hours relative to the time required for polymerization at a constant temperature of 25° C.)

The reaction was stopped at this time, and, after still unreacted monomer was discharged the resulting polymer was filtered, washed with water and then dried for 10 hours at 70° to 80° C.

As a result, the polymerization yield was 90 percent (1,090 g.), and the polymer thus produced had an inherent viscosity, $\eta$ inh, (a measure of the degree of polymerization) of 1.05 and an apparent density of 37 g./dl. and consisted of particles of sizes from 100 to 200 microns. In comparison, a polymer prepared by polymerization at a constant temperature of 25° C. had an inherent viscosity, $\eta$ inh, of 1.10 and an apparent density of 39.5 g./dl. and consited of particles of sizes from 100 to 200 microns, which properties are almost the same as those of the polymer produced in accordance with the invention with a saving of approximately 10 hours in polymerization time.

EXAMPLE 2

The procedure set forth in example 1 was followed up to the point immediately prior to stopping of the polymerization, at which time the temperature was further raised to a temperature above 90° C. The pressure thereupon rose by from 2 to 3 kg./cm² but thereafter dropped rapidly, becoming 3 kg./cm.² in approximately 30 minutes.

The resulting charge was then left undisturbed for a further 30 minutes after which the temperature within the autoclave was caused to decrease to room temperature, and the polymer thus obtained was taken out, filtered, washed with water and then dried for 20 hours at from 50° to 60° C. The resulting polymerization yield was 94 percent (1,135 g.). The polymer thus produced had an inherent viscosity $\eta$ inh, of 1.05 and an apparent density of 39 g./dl. and particle sizes of from 100 to 200 microns. The thermal stability of this polymer was found to be even better than that of the polymer obtained in example 1.

EXAMPLE 3

Polymerization was started with the same apparatus as described in example 1 operated at an agitation speed of 400 r.p.m. and with the charge specified in example 1 except for the use of 12 g. of the di-normal-propylperoxidicarbonate and 24 g. of acetone.

After 8 hours from the start of polymerization, the pressure began to decrease as indicated by curve (A) in FIG. 2 and at 12 hours reached a value of 35 kg./cm.² At this time, the temperature was raised to 35° C., and vinylidene fluoride monomer was supplementarily added under pressure from the cylinder on the weighing scale by the same procedure as set forth in example 1.

During this procedure, the charging of the monomer was stopped so as to prevent the pressure from exceeding 36 kg./cm.² After approximately 10 minutes, the pressure decreased to 35 kg./cm.², whereupon the monomer was again added until the pressure reached 36 kg./cm.². This procedure was repeated until a total quantity of 300 g. of the supplementary monomer had been charged.

Upon completion of this charging, the reaction was permitted to continue naturally, and at 25 hours after the start of polymerization, the pressure reached 20 kg./cm.². At this time, the temperature was raised to a value above 90° C. as indicated in FIG. 2, whereupon the pressure temporarily increased by 2 to 3 kg./cm.² and then dropped rapidly until it reached 3 kg./cm.² after 30 minutes. The charge was left undisturbed for a further 30 minutes and then cooled by water to room temperature. The polymer was then taken out of the autoclave and subjected to the same aftertreatment as set forth in example 1.

The resulting polymer was obtained with a yield of 97 percent and 30 an apparent density of 53.6 g./dl. and an inherent viscosity, $\eta$ inh., of 1.06.

When this polymer was compared with a polymer prepared by a single supplementary addition of the monomer at a constant temperature of 25° C. as indicated by curve (B) in FIG. 2, the two polymer were found to have almost exactly the same general properties, but the former, prepared as described in the present example 3, was far superior in features such as thermal resistance and in the time required for polymerization, this time being shortened by 22 hours relative to that of the latter polymer. Furthermore, the polymer of the present example was found to be particularly suitable for use in the field of fluid lining.

EXAMPLE 4

The same apparatus as specified in example 1 was charged with 3,500 g. of water 3.5 g. of methylcellulose, 2.4 g. of sodium pyrophosphate ($Na_4P_2O_7 \cdot 10H_2O$), and 6 g. of di-iso-propylperoxydicarbonate used as a polymerization catalyst, and then the autoclave was cooled to a temperature below $-20°$ C. and thoroughly evacuated.

Then 1,200 g. of tetrafluoroethylene monomer previously weighed at a temperature below $-20°$ C. was charged under pressure into the autoclave with the use of nitrogen gas ($N_2$). The autoclave was then placed in a constant-temperature water bath at 25° C. and polymerization of the monomer therewithin was started at an agitation speed of 300 r.p.m.

The pressure was initially 38 kg./cm.² but, after approximately 10 hours, began to decrease as the polymerization reaction progressed. At this time, the temperature was raised to 45° C. whereupon the pressure reached a value of 50 kg./cm.² but began to decrease immediately thereafter, reaching a value of 20 kg./cm.² at 16 hours after the start of polymerization. (This time of 16 hours was 9 hours shorter than the polymerization time in the case of constant-temperature polymerization at 25° C.)

The polymerization was then stopped, and the same aftertreatment as set forth in example 1 was carried out, whereupon a polymer was produced with a yield of 93 percent. This polymer has an apparent density of 36 g./dl. and particle sizes of from 150 to 250 microns.

EXAMPLE 5

The same apparatus as described in example 1 was charged with 3,500 g. of water, 3.5 g. of methylcellullose, 2.4 g. of sodium pyrophosphate ($Na_4P_2O_7 \cdot 10H_2O$), and 3.6 g. of $\alpha, \alpha'$-azobisisobutyronitrile used as a polymerization catalyst, and 1,200 g. of vinyl fluoride monomer was charged from a cylinder into the autoclave by the same procedure as set forth in example 1 for vinylidene fluoride. Polymerization was then started at 50° C. with agitation at a rotational speed of 300 r.p.m.

The pressure was initially 42 kg./cm.² but began to decrease after approximately 10 hours. At this time, the temperature was raised to 75° C., whereupon the pressure rose to 62 kg./cm.² but immediately began to decrease until it was 20 kg./cm.² at 18 hours after the start of polymerization. (This time was 6 hours shorter than that in the case of constant-temperature polymerization at 50° C.) The polymerization was stopped at this time, and the resulting polymer was subjected to the same aftertreatment as described in example 1.

As a result, a polymer having an apparent density of 37.5 kg./dl. and particle sizes of from 100 to 250 microns was produced with a yield of 90.5 percent.

It should be understood, of course, that the foregoing disclosure relates to only examples of preferred embodiments of the invention and that it is intended to cover all changes and modifications of the examples of the invention herein chosen

What we claim is:

1. A process of polymerizing a fluorine-substituted ethylene monomer and producing a polymer of high apparent density and high thermal stability which comprises suspension polymerizing the monomer at a temperature below the critical temperature thereof at which the monomer primarily assumes a liquid state in the initial period of the polymerization, raising the polymerization temperature above said critical temperature at a time after polymer particles have been formed, and adding a supplementary quantity of the monomer to the reaction system to avoid a large variation in the polymerization pressure, beginning at said time.

2. The method as claimed in claim 1 in which the polymerization temperature is raised to a value of from 60° to 150° C. in the final period of the polymerization for the purpose of increasing the yield and thermal stability of the resulting polymer.

3. The method as claimed in claim 1 in which the fluorine-substituted ethylene is selected from the group consisting of vinylidene fluoride, vinyl fluoride, trifluoroethlene, and tetrafluoroethylene.

* * * * *